Dec. 4, 1923.
L. W. CARROLL
1,475,933
DERECTIFYING SYSTEM
Filed Nov. 3, 1919
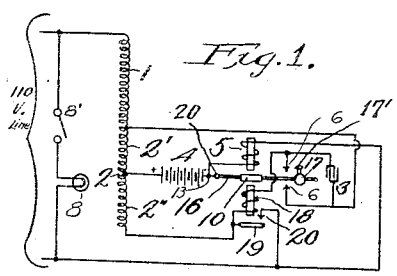
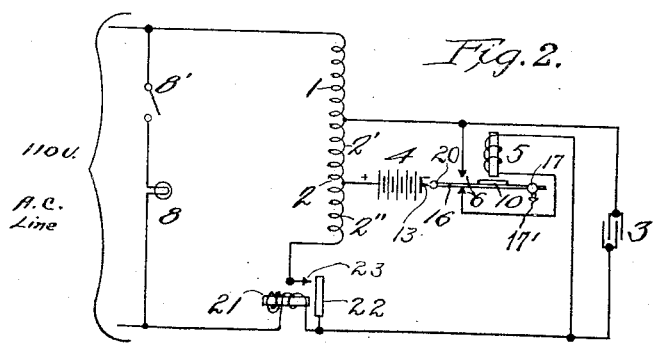

Patented Dec. 4, 1923.

1,475,933

UNITED STATES PATENT OFFICE.

LOUIS W. CARROLL, OF RIVERSIDE, ILLINOIS, ASSIGNOR OF ONE-HALF TO GLENN MUFFLY, OF CLEVELAND, OHIO.

DERECTIFYING SYSTEM.

Application filed November 3, 1919. Serial No. 335,488.

*To all whom it may concern:*

Be it known that I, LOUIS W. CARROLL, a citizen of the United States of America, and a resident of Riverside, county of Cook, and State of Illinois, have invented certain new and useful Improvements in Derectifying Systems, of which the following is a specification.

This invention relates to the conversion and distribution of electric power, and more specifically to the supply of lighting current at full normal voltage, say 110 volts, from the low voltage batteries of farm lighting systems.

It has been usual, in the case of many plants of small isolated character, to provide an internal combustion engine in combination with a generator and a storage battery, both of low voltage, for example 32 volts, the battery being adapted to be used as a source of electrical power at such low-load times as when the requirements would not call for or warrant the running of the engine and the generating equipment. With this arrangement it is necessary to provide the electrical system with conductors of comparatively large current-carrying capacity and to provide accessories of a more or less special nature adapted to use the low voltage current. Such plants are arranged for starting the engine by means of the battery, and the latter is charged from time to time, as necessary, from the generator.

In special cases, plants have been designed for furnishing a current of comparatively high potential, for example, 110 volts. But owing to the fact that it is more expensive to furnish a battery to store a given amount of electrical energy at this potential than at a low potential, the necessary number of units of which are more costly to furnish and maintain than the lesser number of larger units in the low potential systems, it is often considered prohibitive to install a full potential battery for small systems of the general character to which this invention relates. It has been customary in the case of generator operated plants of the 110-volt type to start the generator whenever current is to be used, and to provide a storage battery of low voltage for starting the engine at such times. In some cases, the distribution circuit normally is so connected that the turning on of a single lamp will cause battery current to flow through sensitive controlling means sufficient to start the engine and connect the distribution line directly to the generator. With such a device, the apparatus restores to its normal no-load condition as soon as the current-using object is cut off, as a result of which the engine stops.

In view of the foregoing statement, it will be readily understood that in such a system, in order to provide electric power for a single light or a current-using device in which a small or minimum amount of current is required, it is always necessary to operate the engine, however small the load, in which case the operation will be more or less inefficient, due to the comparatively light load on the generating equipment. Some plants do not include a generator but such devices are of minor importance.

It is mainly the object of this invention to provide an improved form of farm-lighting system and method of operating same; a further object is to obviate the necessity of starting the engine and generator of an isolated power plant for handling small loads, and to substitute therefor means adapted to supply the necessary current, through suitable intermediary modifying apparatus, from a low-voltage battery; another object is to provide an improved form of derectifying system adapted for farm lighting; another object is to provide a combination battery-operated interrupter and transformer outfit, with connections therefor, adapted to start and stop automatically, for supplying suitable working current to the line; and still another object is to provide in such systems an improved and more efficient arrangement and connection of windings and apparatus for battery-operated periodic-current adjustable-voltage interrupting converters.

An illustrative embodiment of this invention is shown in the accompanying drawings, in which—

Fig. 1 is a conventional circuit diagram of one embodiment of the invention, in which the line and converter are normally connected to the battery.

Fig. 2 is a diagram showing a modified embodiment of the invention, including a relay adapted to connect and start the converter automatically upon connecting any load to the line, as for instance a single lamp.

In said diagrams the apparatus is represented in its inactive position, the manual switches all being shown open. Corresponding parts are indicated by the same numerals throughout.

Referring first to Fig. 1, the auto-transformer has a single continuous winding comprising a secondary part 1 and a primary part 2, connected in series, the latter part 2 including two electrically equal parts 2' and 2" in series with each other. A condenser 3 is connected across the fixed contacts of the vibrator. A storage battery 4 has one side, which may be the positive side as indicated on said view, connected to said transformer at the point where the two primary parts 2' and 2" meet. A vibrator-operating magnet 5 is connected at one end to one side of the battery and at the opposite end to the line. The line load, which of course may vary greatly in magnitude and character, is represented by the lamp 8, bridged across the line. Said lamp is controlled by the switch 8' in series therewith. The interrupter magnet 5 is provided with a vibrating armature 10 for alternating the connection of the two contacts 6, one of which is connected through winding 2' and the other through winding 2" to the said one side of the battery.

The periodicity or speed of the reed or spring 16 is adjustably determined by the weight 17 which is slidable lengthwise on said spring and may be locked in any desired position by means of the set-screw 17'. The fixed end of said spring may be held in any preferred manner at 20.

The converter is shown connected directly to the line, though it is to be understood that a generator or other source of current (not shown) may be connected at times if desired, by any suitable switching means, as understood in the art.

In said Fig. 1, the winding of the vibrator magnet 5 is connected in series with the line and with the transformer parts 1 and 2' and battery 4. Hence when a lamp 8 or other load is thrown on the line the magnet 5 will attract armature 10 and close the spring 16 against one of the contacts 6, namely the upper contact in this view. This establishes for a brief interval a primary circuit including in series the battery, the transformer winding part 2", in which the primary current will be downward, the coil on a second vibrator magnet 18, upper contact 6, and spring 16. Magnet 18 instantly closes armature 19 against contact 20. The coincident secondary circuit includes the line and whatever load it may be carrying, the entire transformer winding, armature 19 of relay 18 and its contact 20. The resulting secondary current impulse is upward, as viewed in said Fig. 1, and is supplemented by the battery acting in the same direction on the line.

The relay 18 is low wound, for example ¼ ohm, and is slow-acting, being provided with a high inertia armature, so as to maintain the circuit closed at contact 20 so long as any load remains on the line. Armature 19 also serves to close a local circuit including the battery, winding 2", armature 19, contact 20, and the winding of magnet 5. The effect of this circuit is to more strongly energize magnet 5.

As soon as said magnet 18 becomes energized it acts on armature 10 and cooperates with the spring action of reed 16 to overcome the pull of magnet 5 on said armature. The latter swings down and the spring 16 is reversed respecting contacts 6. This opens the first-described primary circuit and establishes a new one wherein the current flows up through transformer part 2', lower contact 6, and spring 16. This causes an impulse in the reverse direction through said secondary circuit which remains closed at 19—20.

As soon as the load is removed from the line, the secondary current ceases and magnet 18 is de-energized, the contact 19—20 opens, and the circuit as a whole restores to its normal no-load condition.

In said Fig. 2 the winding of magnet 5 is normally connected in series with the battery through the normally closed lower contact 6, and also with the line through the transformer parts 1 and 2' on one side and through the winding of a low-wound slow-acting relay 21 on the other side, so that said relay 5 may be instantly responsive to the imposition of any load on the line. The current in relay 21 causes its armature 22 to close on contact 23. Whenever a lamp 8 or other load is connected to the line, current flows through said circuit and actuates magnet 5 and closes the upper contact 6, thereby establishing for a moment a primary circuit from the battery up through part 2' of the transformer upper contact 6, spring 16, and back to battery. This causes a downward secondary impulse, through the transformer winding as a whole and out on the line directly on one side and through contact 22—23 and the low resistance winding of relay 21 on the other side. But the said pulling up of armature 10 causes the lower contact 6 to open, and this serves to de-energize magnet 5 and permits armature 10 and spring 16 to restore. Another primary circuit is then established from the battery downward through contacts 22—23 and back to battery through the low resistance winding of magnet 5 and lower contact 6.

This permits a primary current to flow downward through winding part 2″ and causes a corresponding reverse upward secondary impulse leading to the line.

The relay 21 is of slow-acting character and is held locked by the alternating current.

Upon removal of the line load, relay 21 releases its armature 22, and the device restores to its normal no-load condition.

Although several specific embodiments or modifications of this invention are herein set forth, it will be understood that no attempt has been made to show all practical and useful embodiments of the invention, and that some of the details of the circuits shown may be altered or omitted without departing from the spirit of this invention as defined by the following claims.

I claim:

1. In a derectifying system of the character described, a battery, a periodic current generator operable on said battery, said generator including a transformer, a vibrating current interrupter and a relay normally connected in series with the line and said battery and capable of holding its armature actuated when periodic current is applied to its winding, said armature serving to close the transformer secondary across the line in operation.

2. In a derectifying device of the character described, a vibrating interrupter mechanism and transformer device operable on a battery and comprising an auto-transformer having part of its circuit normally open, a starting magnet preferably of high resistance permanently in series with the line and the battery, and an operating magnet preferably of low resistance in series with the transformer winding, the latter magnet having an armature arranged to close the transformer circuit.

3. In a derectifying system, a transformer having a secondary and a double-wound primary circuit conductively connected to a primary source of power, a vibratory mechanism having contacts for connecting the primary source of power alternately to each half of the primary circuit, an operating magnet in the vibratory mechanism connected normally in series with the secondary circuit and the primary source of power, and a suitable relay in series with the secondary circuit for closing the primary circuit.

4. In a derectifying system, in combination, a source of direct current, an electro-responsive device adapted to be operated at a different voltage from that of the direct current source, a transformer, a primary and secondary circuit therefor, means to connect the said device across the said secondary circuit, a current commutator, said direct current source being adapted to be connected to the said primary circuit through said commutator, and motor means for operating the said commutator, said source of current and said motor means being normally connected in series with said secondary circuit.

5. In a derectifying system, in combination, a source of direct current, an electro-responsive device adapted to be operated at a different voltage from that of the direct current source, a transformer, a primary and secondary circuit therefor, means to connect the said device across the said secondary circuit, a current commutator, said direct current source being adapted to be connected to the said primary circuit through said commutator, relay means controlling the connection of the said secondary circuit to the said device, an operating winding therefor, said winding being connected in circuit with the said device and device connecting means.

Signed at Chicago this 30th day of October, 1919.

LOUIS W. CARROLL.